Aug. 18, 1964   G. BONNET ETAL   3,145,336
APPARATUS FOR MEASURING MAGNETIC FIELDS
Filed Dec. 11, 1959
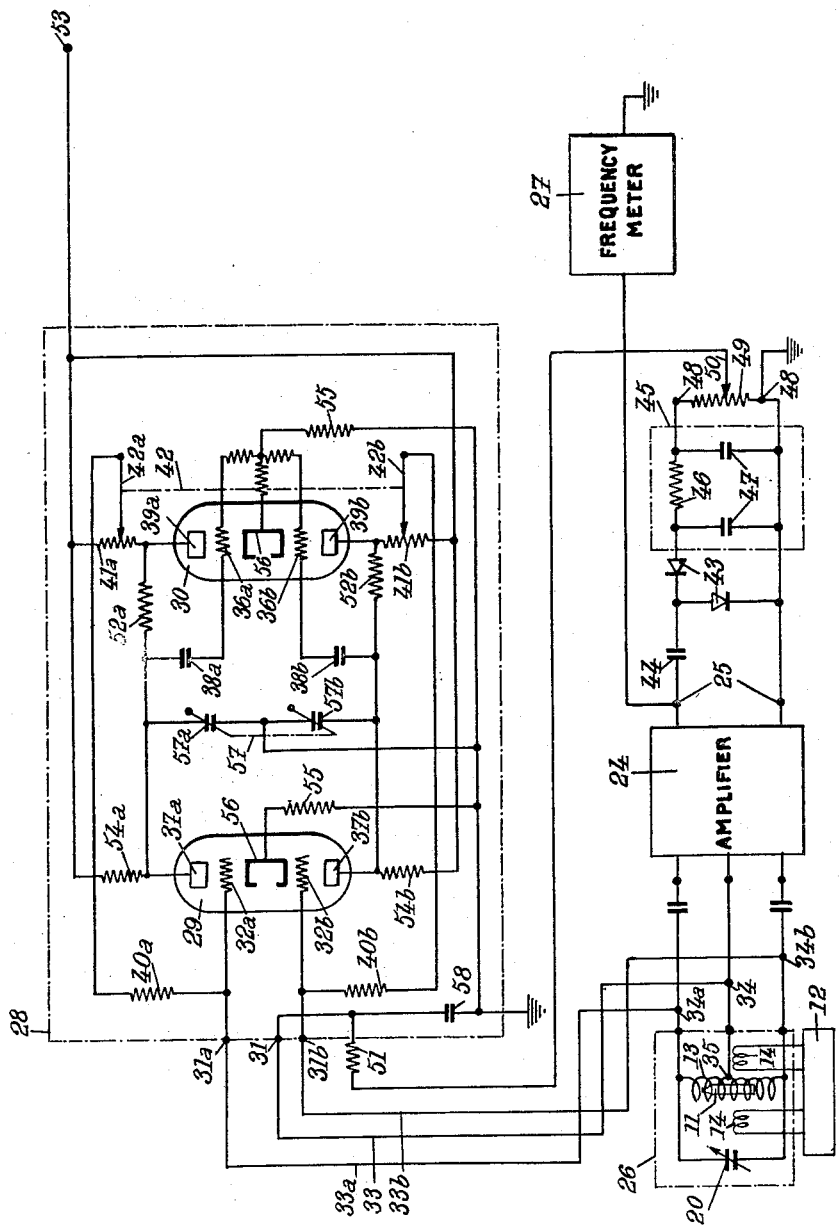
INVENTORS
GEORGES BONNET
and ANTOINE SALVI
BY
ATTORNEY .# United States Patent Office 3,145,336
Patented Aug. 18, 1964

3,145,336
APPARATUS FOR MEASURING MAGNETIC FIELDS
Georges Bonnet, Grenoble, and Antoine Salvi, Saint-Egreve, France, assignors to Commissariat à l'Energie Atomique, Paris, France, an organization of France
Filed Dec. 11, 1959, Ser. No. 859,068
Claims priority, application France Dec. 16, 1958
5 Claims. (Cl. 324—.5)

The present invention relates to apparatuses or magnetometers for measuring magnetic fields, even very weak, and in particular the earth magnetic field.

More particularly it relates to magnetometers of the type described in the prior patent applications S.N. 725,746 filed by Messrs. Anatole Abragam, Jean Combrisson and Ionel Solomon on April 1, 1958, and now Patent No. 3,049,161, and S.N. 813,158 filed by said above-mentioned applicants on May 14, 1959, and now Patent No. 3,049,662, both applications being assigned to the Commissariat à l'Energie Atomique, and making use, as element sensitive to the magnetic field to be measured, of a liquid sample consisting of a solution containing, on the one hand in the solvent, atomic nuclei having an angular momentum and a magnetic moment which are not equal to zero and, on the other hand dissolved in this solvent, a paramagnetic substance of hyperfine structure of the stationary or bound type, that is to say including at least one unpaired electron in the S-state with respect to a nucleus of said paramagnetic substance (also having an angular momentum and a magnetic moment different from zero) and having a narrow electrotronic resonance band or line of a frequency different from zero even in a magnetic field equal to zero.

An accurate measurement of magnetic fields is possible when using such a sample as sensitive element, because:

First, the nuclear resonance frequency (also called Larmor frequency) of the atomic nuclei of the solvent is exactly proportional to the strength of the magnetic field, in which the sample is located;

And, secondly, it was found that when solutions of such paramagnetic substances (e.g. metallic salts of the transition groups or free radicals) were subjected to the action of strong polarizing (magnetic) fields at the electronic resonance frequency of said paramagetic substance, there was obtained an increase of the nuclear polarization of the solvent (consisting for instance of a liquid such as water containing protons as useful atomic nuclei), that is to say of the nuclear resonance macroscopic signal of this solvent, the solution therefore displaying, when one of its electronic resonance lines is saturated, a resonance phenomenon at the nuclear resonance frequency of the atomic nuclei of the solvent in the magnetic field wherein they are located, but with an increased intensity; the increase that is observed for the polarization of the atomic nuclei of the solvent is due, inter alia, to the fact that the unpaired paramagnetic electron is subjected, not only to the action of the external magnetic field—which may be very low (averaging 0.5 gauss in the case of the earth field)—but also to the influence of the field produced by the magnetic moment of the nucleus of said paramagnetic substance with which it is coupled by the hyperfine structure.

Furthermore, the polarization of protons being negative when a paramagnetic substance of the above-mentioned type is used, their nuclear paramagnetic susceptibility is also negative, which permits the operation of the measuring apparatus as a self-oscillating device of the "maser" type (*m*icrowave *a*mplification by *s*timulated *e*mission of *r*adiations).

It was stated in the first mentioned prior patent application that, when some conditions concerning the sign of the magnetic moment were complied with, there was obtained an emission of energy by the atomic nuclei of the solvent at the nuclear resonance frequency thereof, instead of the usual energy absorption, and FIGS. 4 and 5 of said application showed an apparatus for measuring, without any frequency or magnetic field sweep, the strength of magnetic fields (in particular of the earth magnetic field e.g. for prospecting useful minerals), this apparatus, which is based upon such a spontaneous emission of energy, comprising means for saturating the electronic resonance frequency line of the solution, means for collecting the energy emitted by said solution at the nuclear resonance frequency of the solvent nuclei in the magnetic field in which the solution is placed, and means for measuring the frequency of the energy thus collected, this frequency being, as above indicated, exactly proportional to the strength of said magnetic field and the proportionality coefficient being accurately known (see for instance the table on pages 2249 to 2251 of the Handbook of Chemistry and Physics, Chemical Rubber Publishing Co., Cleveland, Ohio, which gives the nuclear frequencies, i.e. Larmor frequencies, in megacycles for 10,000 gauss fields).

An apparatus for measuring magnetic fields making use, according to the above-mentioned applications, of the spontaneous emission of energy at a frequency exactly proportional to the magnetic field by a solution containing on the one hand, atomic nuclei having an angular momentum and a magnetic moment different from zero and, on the other hand, a paramagnetic substance of the above-mentioned type essentially comprises:

(1) A container containing the above mentioned solution, for instance a solution in water of nitrosodisulfonate (also called peroxylamine disulfonate);

(2) A high frequency circuit for saturating an electronic resonance line of said paramagetic substance, this circuit being tuned to the frequency of said line (55 mHz. for nitrosodisulfonate in a magnetic field equal to zero or a very weak field) and including, on the one hand, a high frequency coil surrounding said container and a tuning capacitor and, on the other hand, an oscillator delivering energy at the same high frequency for feeding said coil;

(3) A low frequency circuit for collecting the energy emitted by said solution at the nuclear resonance frequency of the solvent (2,100 Hz. for the protons of water in the earth field), this low frequency circuit, which includes a low frequency coil for collecting said energy and a tuning capacitor, being capable of being tuned to said frequency and having a very high quality or Q factor, so as to be able to operate as a self-oscillator or maser at this frequency;

(4) A measuring instrument (for instance of the decade counter type) for determining with a high precision the oscillation frequency of the low frequency circuit, this frequency being proportional to the strength of the magnetic field in which the container is placed.

Considering now more particularly the low frequency resonant circuit, constituted essentially by a low frequency coil and a tuning capacitor, the self-oscillation thereof is realized, in a known manner, by shunting said resonant circuit by a negative-resistance network, for example and electronic network constituting an amplifier with electron discharge tubes, as in the embodiment of FIG. 5 of the first mentioned patent application.

The arrangement according to said patent application included, for allowing the low frequency circuit to operate as an oscillator or maser, two tuning possibilities or factors, i.e. the adjustability of the capacitance of said tuning capacitor and of the feedback factor between two portions of the amplifier constituting the electronic network.

In fact, in a narrow frequency band, centered around the nuclear resonance frequency or Larmor frequency, the real portion or conductance G of the complex admittance $G+jY$ (the reciprocal of the complex impedance) of the low frequency circuit or nuclear oscillator decreases and becomes $G-dG$ due to the energy emission by the liquid sample (an electronic resonance line of which has been saturated by the high frequency circuit), and simultaneously the purely imaginary portion or susceptance $jY$ of said complex admittance is submitted to a corresponding variation.

If, then, this low frequency circuit is shunted by an electronic network having an input admittance $G'+jY'$ ($G'$ being its input conductance and $jY'$ its input susceptance), it is known that, for obtaining oscillations in the resulting system, it is necessary that:

(1) $G'$ be negative (so that the network enjoys a negative resistance),
(2) The absolute value of $G'$ be superior to $G-dG$,
(3) $Y'$ be of the same absolute value as $Y$, but of opposite sign.

Furthermore, in order to obtain oscillations in said system at the Larmor frequency, it is also necessary that:

(4) The absolute value of $G'$ be inferior to $G$.

This last condition arises from the fact that, when the absolute value of $G'$ is superior to $G$, free oscillations occur in said system as in the conventional negative-resistance oscillators, the frequency of the free oscillations, which is determined by the characteristics of the low frequency circuit and of the electronic network, being independent of the Larmor frequency and accordingly of the strength of the magnetic field to be measured.

Therefore, in order to obtain a self-oscillation at the Larmor frequency of the low frequency circuit and accordingly an operation as a maser of the measuring apparatus, the following conditions have to be satisfied simultaneously:

$$G'<0 \qquad (A)$$
$$G-dG<-G'<G \qquad (B)$$
$$Y'=-Y \qquad (C)$$

In other words, the satisfaction of the conditions necessary for locking up the nuclear oscillator on the Larmor frequency demands the simultaneous and precise setting of two magnitudes, for example of a capacitance and of a feedback factor; it is why there was provided in the arrangement shown on FIG. 5 of said first mentioned patent application an adjustable capacitor allowing to set the tuning capacitance and a potentiometer allowing to set the feedback factor of the electronic network.

But this double setting is a difficult and long operation when the strength of the magnetic field to be measured (in which the liquid sample containing the paramagnetic substance is located) is not previously known with a sufficient approximation.

Furthermore, the keeping—during operation—of condition B and C, in order to prevent as well the stopping of the oscillations as a parasitic functioning of the oscillator on its own free frequency (and no more as a maser) demands a great stability of the amplification or gain of the electronic network relatively to the external influences, as a variation of said amplification produces a modification of the conductance and susceptance of the network.

In order to permit the setting of the oscillation conditions, as well as their keeping during the functioning of the apparatus, we had the idea, on the one hand, to realize the adjustment or setting of the imput conductance of the electronic network by rendering said conductance dependent on the amplitude of the oscillations delivered by the nuclear oscillator and, on the other hand, to render the input susceptance of said network negligible compared with the susceptance of the adjustable capacitor of the low frequency circuit, thereby enabling to satisfy Equation C by an easy adjustment of said capacitor.

The invention therefore has for its object an apparatus for measuring magnetic fields which first comprises, according to the above-mentioned prior patent applications, a container containing a solution consisting of a solvent including atomic nuclei having an angular momentum and a magnetic moment different from zero and of a paramagnetic substance of the above specified type dissolved in said solvent, said solution emitting, when one of the electronic resonance lines of said paramagnetic substance is saturated, energy at the nuclear resonance frequency of said atomic nuclei, at least one high frequency coil disposed relatively to said container in such manner as to create therein a polarizing field when electric current is passed through said coil, means for supplying said coil with electric current at the frequency of said electronic resonance line so as to saturate said line, at least one low frequency coil disposed, relatively to said container, in such manner as to collect said energy at the nuclear resonance frequency, an adjustable capacitor connected with said low frequency coil so as to constitute therewith, at said nuclear resonance frequency, a resonant circuit of high Q factor capable of sustaining oscillations in response to said energy collected by said low frequency coil, and means for measuring the frequency of said oscillations, and is characterized by the fact that it further comprises, for realizing an automatic adjustment of the self-oscillation conditions of said resonant circuit on the nuclear resonance frequency, an electronic network having an input admittance constituted by the sum of a negative conductance and of a susceptance, means for rendering said conductance dependent on the amplitude of said oscillations in said resonant circuit so that the absolute value of said conductance be a decreasing function of said amplitude, and means for rendering negligible said susceptance.

Such locking up of the input impedance of the electronic network shunting the nuclear oscillator brings a material modification of the operative conditions of the apparatus for measuring magnetic fields, the functioning of which will be explained herein below, after the detailed description of a particular embodiment of said apparatus.

In fact, by adjusting according to the invention the conductance and susceptance of the electronic network:

On the one hand, an operation as a self-oscillator of the low frequency circuit is ensured due to the keeping of the network conductance at the value necessary for such an operation.

On the other hand, the frequency stability of the oscillations and, therefore, the precision of the measurement of the Larmor frequency (i.e. finally the precision of the measure of the strength of the magnetic field wherein the liquid sample is located) are increased due to the negligible input susceptance of the electronic network, as said susceptance would otherwise modify the oscillation frequency.

As concerns the adjustment of the input conductance of an electronic network, it is known that such an adjustment may be performed by modifying either the feedback factor or the amplification of said network as these characteristics have asymmetrical influence on said conductance.

We have found that, within the scope and limits of the invention, it was particularly advantageous to realize the automatic adjustment of the input conductance of the electronic network by rendering the amplification of the network dependent on the amplitude of the oscillations or voltage delivered by the nuclear oscillator and to provide an adjustability of the feedback factor of said network for performing a limited gross pre-setting of said conductance before the operation as a maser of the apparatus.

Of course, when the automatic adjustment of the input conductance is performed by varying the amplification of the electronic network, it is still more essential that the input susceptance of same network be reduced to a negligible value, as said conductance—which has an influence on the oscillation frequency of the maser—depends (as well known in the art) on the amplification or gain of this network and as said gain varies between large limits.

All these conditions are satisfied in the preferred embodiment of the invention, wherein:

The electronic network is constituted by an amplifier comprising essentially a first amplification stage with a variable gain, a second amplification stage and an adjustable feedback circuit or loop between the second and the first stage;

The means for adjusting or regulating the input conductance of the electronic network comprise, on the one hand, means for deriving from the oscillating voltage, generated in the reasonant circuit, an unidirectional or D.C. voltage having an amplitude which is proportional to the amplitude of said oscillating voltage and, on the other hand, means for delivering said unidirectional or D.C. voltage in the first amplification stage so as to reduce the gain of said first stage when the amplitude of said unidirectional or D.C. voltage increases, said unidirectional or D.C. voltage being for example applied as bias voltage on the control electrode of the tube or tubes of said first stage, which operate in the non-linear portion of their characteristics.

And the means for minimizing the input susceptance of the electronic network comprise, on the one hand a negative feedback loop or circuit in the second amplification stage and, on the other hand, at least one variable compensating or neutralizing capacitor adapted to balance the phase shift produced by said electronic network so as to render it equal to zero for a frequency located substantially in the center of the working frequency band corresponding to the magnetic field to be measured.

Furthermore, it is advantageous to utilize a completely symmetrical arrangement of the low frequency circuit and of the electronic network so as to reduce the background noises, and in particular the input noise, which have a detrimental influence on the precision of the measure of the Larmor frequency.

The aforesaid and other objects, features and advantages of the invention will be more easily and fully understood from the illustration of one embodiment of an apparatus for measuring magnetic fields according to the invention, being understood that the invention is not restricted to the details of the illustrated and described embodiment, but that it is susceptible to modifications and adaptations.

In the attached drawing, the single figure shows diagrammatically an apparatus for measuring even very weak magnetic fields according to the above-mentioned patent applications and further embodying the improvements according to the present invention.

Referring to the figure, it will be seen that an apparatus according to the invention for measuring magnetic fields includes:

(1) A container 11 containing a solution consisting of:

A solvent (generally an ionizing solvent) which includes atomic nuclei having an angular momentum and a magnetic moment different from zero, this solvent consisting for instance of water (with protons as useful atomic nuclei), and A paramagnetic substance dissolved in said solvent, the concentration of said paramagnetic substance being very low and non critical (it is generally present in the form of traces); this paramagnetic substance, which may be a metallic salt of a transition group or a free radical, is of the type having a stationary or bound hyperfine structure, i.e. it includes in its structure at least one unpaired electron in the S state with respect to an atomic nucleus of the paramagnetic substance (said nucleus having also an angular momentum and a magnetic moment different from zero) and the resonance line of this electron being narrow, said solution emitting, when one of the electronic resonance lines of the paramagnetic substance is saturated by a polarizing (magnetic) field, energy at the frequency of the nuclear resonance line of said atomic nuclei in the magnetic field in which said solution is placed, this frequency being exactly proportional to the strength of said field for the reasons stated in this first mentioned patent application; among the solutions which may be utilized in an apparatus capable of operating as a self-oscillating device of the maser type, we may cite, merely by way of example and without any given limitive character:

A solution of potassium or sodium nitrosodisulfonate in water, pyridine or formamide;

A solution of diphenyl-picrylhydrazil in benzene or other organic solvents;

A solution of nitrosodisulfonate of tetraphenylstibonium in ether;

A solution of picryl-aminocarbazyl in benzene;

An aqueous solution of ions of a semiquinone, such as $(O\!=\!C_6H_4\!-\!O)^-$;

(2) A high frequency circuit adapted to produce a polarizing field for saturating one of the electronic resonance lines of the paramagnetic substance, this high frequency circuit—which is fed by very stable oscillator 12 (e.g. of the type described in the second mentioned patent application and operating for example at a frequency of 55 mHz. when measuring the earth magnetic field with an aqueous solution of nitrosodisulfonate as liquid sample)—including one or two high frequency coils 14, with a reduced number of turns made in a relatively thick wire, adapted to produce said polarizing field inside said container 11 and a (not shown) capacitor for tuning said circuit at said electronic resonance frequency;

(3) A low frequency circuit or nuclear oscillator 26 comprising essentially a low frequency coil 13, with many turns of thin wire, surrounding container 11 for collecting the energy delivered by the solution contained therein at the nuclear resonance frequency of said solution, and a tuning adjustable capacitor 20 for constituting a resonant circuit at said nuclear resonance frequency and sustaining oscillations at said frequency in response to the energy picked up by coil 13;

(4) Means for determining with a high precision the frequency of said oscillation, said determination being performed—after amplification in an amplifier 24 (which may be for example of the type disclosed in the second mentioned patent application) of the oscillating voltage delivered by circuit 26—by a frequency meter 27 (for example a decade counter of the type used in an instrument for counting nuclear radiations) connected across terminals 25 of amplifier 24.

The apparatus described until now is similar to the device illustrated in FIG. 4 of the first mentioned patent application and described with reference to said figure, and therefore the same reference numerals 11, 12, 13, 14, 24 and 25 were used in the appended figure and in FIGURE 4 of said patent application for representing corresponding parts; furthermore, as disclosed in the second mentioned patent application, a (not shown) electric shield may be advantageously provided between coils 13 and 14.

(5) An electronic network 28, of the negative-resistance type, shunting the low frequency circuit 26, this network being constituted, as in the arrangement shown in FIG. 5 of the first mentioned patent application, by an amplifier.

But in the embodiment illustrated in the appended figure, the amplifier comprises two successive amplification stages, with a variable feedback between the output stage and the input stage, and is constituted essentially by two electronic discharge tubes, for example two double triodes 29 and 30 forming the two amplification stages.

In order to reduce, for the above-mentioned reasons, the external influences of background noise and of the feeding voltage drifts, an entirely symmetrical arrangement of the low frequency circuit 26 and of the electronic network 28 is utilized and accordingly the same reference numerals, to which are added respectively letters $a$ and $b$, were used for the symmetrical elements in each couple of elements in circuit 26 and network 28.

The input terminals 31, 31$a$, 31$b$ of network 28—the two last terminals being connected to the control electrodes or grids 32$a$, 32$b$ of tube 29—are connected, by leads 33, 33$a$, 33$b$, to the output terminals 34, 34$a$, 34$b$ of the low frequency circuit 26, whereas the coupling between the two stages of the amplifier is realized by connecting the control grids 36$a$, 36$b$ of second tube 30 to anodes 37$a$, 37$b$ of first tube 29 through capacitors 38$a$, 38$b$.

In some way, the apparatus described until now with reference to the figure constitutes only a modification, with a symmetrical arrangement, of the device shown in FIG. 5 of the first mentioned patent application.

According to the main feature of the invention, the adjustment of the input admittance of electronic network 28 is realized so as to comply simultaneously with conditions B and C in the following manner:

(1) As concerns first the adjustment or regulation of the input conductance of said network:

($a$) There is provided, mainly for allowing to preset the value of said conductance in the operative frequency range, a variable feedback between the two amplification stages, the feedback circuit or loop between anodes 39$a$, 39$b$ of second tube 30 and the input terminals 31$a$, 31$b$ of network 28 (i.e. the grids 32$a$, 32$b$ of first tube 29) being constituted by the resistors 40$a$, 40$b$ and potentiometers 41$a$, 41$b$, having the runners 32$a$, 32$b$ thereof controlled simultaneously through a common control shaft 42; it is accordingly possible to adjust the feedback factor, i.e. the value $G'$ of the input negative conductance of network 28 for a given gain of the first amplification stage (constituted by tube 29);

($b$) The precise automatic adjustment or regulation of the input conductance of network 28 is realized by rendering the gain of the first amplification stage dependent on the amplitude of the voltage delivered by the low frequency circuit 26; therefore:

On the one hand, from the oscillating voltage across the output terminals 25 of amplifier 24 is derived an unidirectional or D.C. voltage having an amplitude which is proportional to the amplitude of said oscillating voltage, by means of a detector, including two rectifier diodes 43 cooperating with a capacitor 44, and a pi filter 45 constituted by resistor 46 and a pair of capacitors 47, said unidirectional or D.C. voltage appearing across the terminals 48 of filter 45;

On the other hand, by providing a potentiometer 49 across terminals 48, an adjustable fraction of said unidirectional or D.C. voltage is picked up by a slider or runner 50 of said potentiometer, thereby providing the possibility of modifying the adjustment ratio, and said adjustable voltage fraction is applied through resistor 51 on the input terminal 31 of network 28.

The variation or drift, generally in volts, of the potential applied on terminal 31, which is proportional—for a given position of runner 50—to the amplitude of the oscillations in circuit 26, is reproduced, through circuit 26, on terminals 31$a$, 31$b$ and it produces therefore similar variations of the means potential difference between grids 32$a$, 32$b$ and cathodes 37$a$, 37$b$ of tube 29.

If tube 29 operates in a nonlinear portion of its characteristic, a variation of the potential difference between grids and cathodes will produce, for the studied oscillations having an amplitude in millivolts, a modification of the gain such that said gain decreases when said potential difference increases.

It is well known that such gain modification normally has an influence on the susceptance of network 28, but said susceptance is minimized according to the invention.

(2) In fact, the input susceptance of network 28 is reduced to a negligible value in the operative frequency band, first by stabilizing the second amplification stage (including tube 30) by a strong negative feedback performed through resistors 52$a$, 52$b$, said negative feedback reducing the phase shift due to the coupling capacitors 38$a$, 38$b$ and to the parasitic capacitances between anodes 37$a$, 37$b$, 39$a$, 39$b$ and the ground.

It should also be considered that said negative feedback contributes also to reduce the output impedance of network 28 and therefore the influence of the drifts or excursions of the supply voltage on the individual potential of each anode, this supply voltage, provided in 53, being applied on the anodes through potentiometers 41$a$, 41$b$ and anode resistors 54$a$, 54$b$, the complete compensation or neutralization of the drifts being realized by picking up the output voltage between both anodes 39$a$, 39$b$ of tube 30 and by improving the symmetry of the arrangement of network 28 by means of a common resistor 55 for each pair of cathodes 56, a capacitor 58 shielding D.C. from terminal 31 to reach resistors 55 in the network.

The phase shift compensation or neutralization is still improved, so as to minimize the input susceptance of network 28, by adjusting the capacitance of capacitors 57$a$, 57$b$ (adjustable by means of a common control shaft 57), so as to render equal to zero the total phase shift of network 28, i.e. the susceptance thereof, for a frequency located in the center of the working frequency range.

By the combined use of the negative feedback and of the phase shift compensation, an amplifier of very large band width, with compensated phase shift in the working frequency band, is finally provided.

The operation of the apparatus which has been described with reference to the figure is the following:

Before each measurement, the operator adjusts:

The feedback factor of the electronic network 28 by actuating the common control shaft 42 of potentiometers 41$a$, 41$b$, thereby pre-setting the input conductance of network 28, The automatic regulation or adjustment ratio of the input susceptance of said network by setting the runner 50 of potentiometer 49, thereby determining the slope of the curve representative of the variations of the amplification or gain as a function of the oscillation amplitude in circuit 26, And the compensation of the phase shift by actuating the common control shaft 57 of capacitors 57$a$, 57$b$, so as to obtain free oscillations in the low frequency circuit, independently of any nuclear resonance phenomenon in a large frequency band including the supposed value of the Larmor frequency (only a gross knowledge— e.g. with an approximation factor which may be over 2— of the strength of the magnetic field, to be measured and to which said Larmor frequency corresponds, being necessary). Thus, the condition $-G'>G$ is complied with and therefore $G-dG<G'$.

Then, the operator looks after resonance by actuating only the adjustable capacitor 20 and, when the tuning frequency of circuit 26 is very near the Larmor frequency of the liquid sample (contained in container 11) in said magnetic field, the emission of energy by said sample (having its electronic resonance line saturated by the polarizing field produced by coil or coils 14) determines an increase of the oscillating voltage in circuit 26.

The automatic regulation or adjustment of the gain of tube 29 by the unidirectional voltage picked up by runner 50 (and which has an amplitude which is proportional to the amplitude of the oscillating voltage) produces then a decrease of absolute value of the input conductance of the network 28 and, if the regulation ratio has been previously adjusted to a convenient value by a correct setting of runner 50, the apparatus assumes by itself the state in which condition B is complied with.

Furthermore, due to the fact that the input susceptance of network 28 is negligible, the variations of the gain have no detrimental influence on condition C which continues to be complied with.

Therefore, due to the improvements according to the invention, when a frequency band in the proximity of the Larmor frequency is reached, by actuating only adjustable capacitor 20, the apparatus assumes by itself the operation of the nuclear oscillator as a maser without other adjustment operation.

Further, the automatic regulation, through the output voltage of said oscillator, of the gain of tube 29 and the negligible input susceptance of network 28 will maintain this operation as a maser independently, or substantially independently, of any gain modification in the electronic network 28, thereby ensuring a great stability of the oscillation frequency and therefore a high precision of the measure of said frequency. It should also be considered that the symmetric arrangement of circuit 26 and network 28 renders negligible the influence of background noises, which are produced especially, on the one hand, by the introduction of parasitic voltages at the frequency of the supply voltage or at the higher harmonics thereof, the amplitude of said parasitic voltages varying randomly in course of time, and, on the other hand, by the excursions of the supply voltage of the electronic network, excursions which are increased by the feedback loop.

According to the invention, there is finally provided an apparatus which allows to measure easily and very precisely, due to its automatic regulation, the Larmor frequency of a solution of a paramagnetic substance of the above mentioned type located in a magnetic field, and therefore the strength of said magnetic field which is exactly proportional to said Larmor frequency.

Since certain modifications may be made in the device of the present invention without departing from the scope thereof, it is intended that all matter contained in the foregoing description and shown in the accompanying drawing be interpreted merely as illustrative and not in a limiting sense.

What we claim is:

1. Apparatus for measuring magnetic fields which comprises, in combination, a container; in this container, a solution consisting of a solvent containing atomic nuclei having an angular momentum and a magnetic moment different from zero and of a paramagnetic substance having a hyperfine structure of the stationary type with at least one unpaired electron in S state, said substance being dissolved in said solvent, whereby said solution emits, when one of the electronic resonance lines of said paramagnetic substance is saturated, energy at the nuclear resonance frequency of said atomic nuclei; at least one high frequency coil disposed relatively to said container in such manner as to create therein a polarizing field for saturating said electronic resonance line when electric current is passed through said coil; means for supplying said coil with electric current, at the frequency of said electronic resonance line, so as to saturate said line, at least one low frequency coil disposed, relatively to said container, in such manner as to collect said energy at said nuclear resonance frequency; an adjustable capacitor connected with said low frequency coil so as to constitute therewith, at said nuclear resonance frequency, a resonant circuit of high Q factor capable of sustaining oscillations in response to said energy collected by said low frequency coil; means for measuring the frequency of said oscillation; an electronic network having an input admittance constituted by the sum of a negative conductance and of a susceptance, said electronic network being constituted by an amplifier comprising a first amplification stage with a variable gain, a second amplification stage and an adjustable feedback loop between said second and said first stage; means for automatically adjusting said input conductance as a function of the amplitude of said oscillations, said means comprising means for deriving, from the amplitude of said oscillations generated in said resonant circuit, an unidirectional voltage having an amplitude which is proportional to the amplitude of said oscillations, and means for delivering said unidirectional voltage to said first amplification stage so as to reduce the gain of said first stage as said unidirectional voltage increases; and means for minimizing the input susceptance of said electronic network.

2. Apparatus as claimed in claim 1, wherein said means for deriving an unidirectional voltage comprise a rectifier unit connected to said resonant circuit for receiving therefrom the voltage generated therein in response to said energy collected by said low frequency coil, an electric filter connected to said rectifier for receiving the output thereof and adjustable means for picking up an adjustable portion of the output of said filter.

3. Apparatus as claimed in claim 1, wherein said first amplification stage comprises at least one electron discharge tube, including a control electrode and operative in the nonlinear portion of the characteristic amplification curve thereof, and wherein said unidirectional voltage is applied as bias voltage on said control electrode of said tube.

4. Apparatus as claimed in claim 1, wherein said means for minimizing the input susceptance of said electronic network comprise a negative feedback loop in the second amplification stage and at least one adjustable compensating capacitor in said network for allowing to balance the phase shift produced by said electronic network.

5. Apparatus as claimed in claim 1, wherein said low frequency circuit and said electronic network have completely symmetrical arrangements.

References Cited in the file of this patent

Andrew: Nuclear Magnetic Resonance, published by Cambridge University Press, London 1955, pp. 46 to 53 relied on.

Carver et al.: Physical Review, Vol. 102, No. 4, May 1956, pp. 975 to 980.

Allais: Academic Des Sciences, Comptes Rendus, Vol. 246, No. 14, April 1958, pp. 2123 to 2126.